(12) United States Patent  
Finona et al.

(10) Patent No.: US 7,108,430 B2  
(45) Date of Patent: Sep. 19, 2006

(54) OPTIC FIBER TERMINUS INDEXER

(75) Inventors: Michael Santos Finona, Lake Forest, CA (US); Terry Lee Adams, Huntington Beach, CA (US); James Edward Novacoski, Yucaipa, CA (US); Jay Brian Betker, Yorba Linda, CA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 568 days.

(21) Appl. No.: 10/371,071

(22) Filed: Feb. 21, 2003

(65) Prior Publication Data

US 2005/0105876 A1 May 19, 2005

(51) Int. Cl.  
*G02B 6/38* (2006.01)

(52) U.S. Cl. .............. 385/75; 385/66; 385/72; 385/84; 385/147

(58) Field of Classification Search ........... 385/54, 385/60, 66–68, 72, 75, 136–137, 147, 78–84  
See application file for complete search history.

(56) References Cited

U.S. PATENT DOCUMENTS

| 4,190,316 | A |   | 2/1980  | Malsby et al. ........ 350/96.18 |
| 4,607,911 | A |   | 8/1986  | Rhodes ................ 350/96.2 |
| 5,011,246 | A |   | 4/1991  | Corradetti et al. ..... 350/96.2 |
| 5,067,783 | A | * | 11/1991 | Lampert ................. 385/60 |
| 5,093,878 | A |   | 3/1992  | Haley et al. ............. 385/92 |
| 5,727,101 | A |   | 3/1998  | Giebel et al. ............ 385/59 |
| 6,004,045 | A |   | 12/1999 | Snackers et al. ......... 385/92 |
| 6,019,519 | A |   | 2/2000  | Grinderslev et al. ...... 385/56 |
| 6,102,581 | A |   | 8/2000  | Deveau et al. ........... 385/56 |
| RE37,079  | E |   | 3/2001  | Stephenson et al. ....... 385/78 |
| RE37,080  | E |   | 3/2001  | Stephenson et al. ....... 385/78 |
| 6,238,101 | B1|   | 5/2001  | Chen et al. .............. 385/60 |
| 6,287,018 | B1|   | 9/2001  | Andrews et al. ........... 385/60 |
| 6,331,079 | B1|   | 12/2001 | Grois et al. .............. 385/53 |
| 6,347,889 | B1|   | 2/2002  | Cheng .................... 385/60 |
| 6,396,982 | B1| * | 5/2002  | Lin ...................... 385/37 |
| 6,443,626 | B1| * | 9/2002  | Foster ................... 385/56 |

* cited by examiner

*Primary Examiner*—Akm Enayet Ullah  
*Assistant Examiner*—Jerry T Rahll  
(74) *Attorney, Agent, or Firm*—Roger C. Turner

(57) ABSTRACT

Each optical fiber terminus (20) of a connector has an indexing device (32) that indicates and fixes the rotational position of the terminus in its housing passage (14), the indexing device being in the form of a sleeve that is easily applied when an optimum position is determined. The indexing sleeve is fixed directly to the stripped optic fiber cable (30) at a location immediately rearward of the terminus body (24), so a rear end of the indexing sleeve lies at the rear end of the housing. The indexing sleeve rear end has a radial projection (82) that projects into a slot (84) formed in the rear surface (86) of the connector.

14 Claims, 2 Drawing Sheets

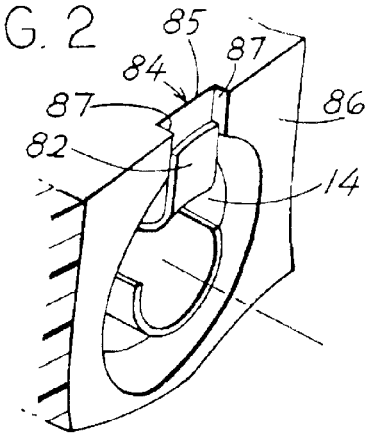
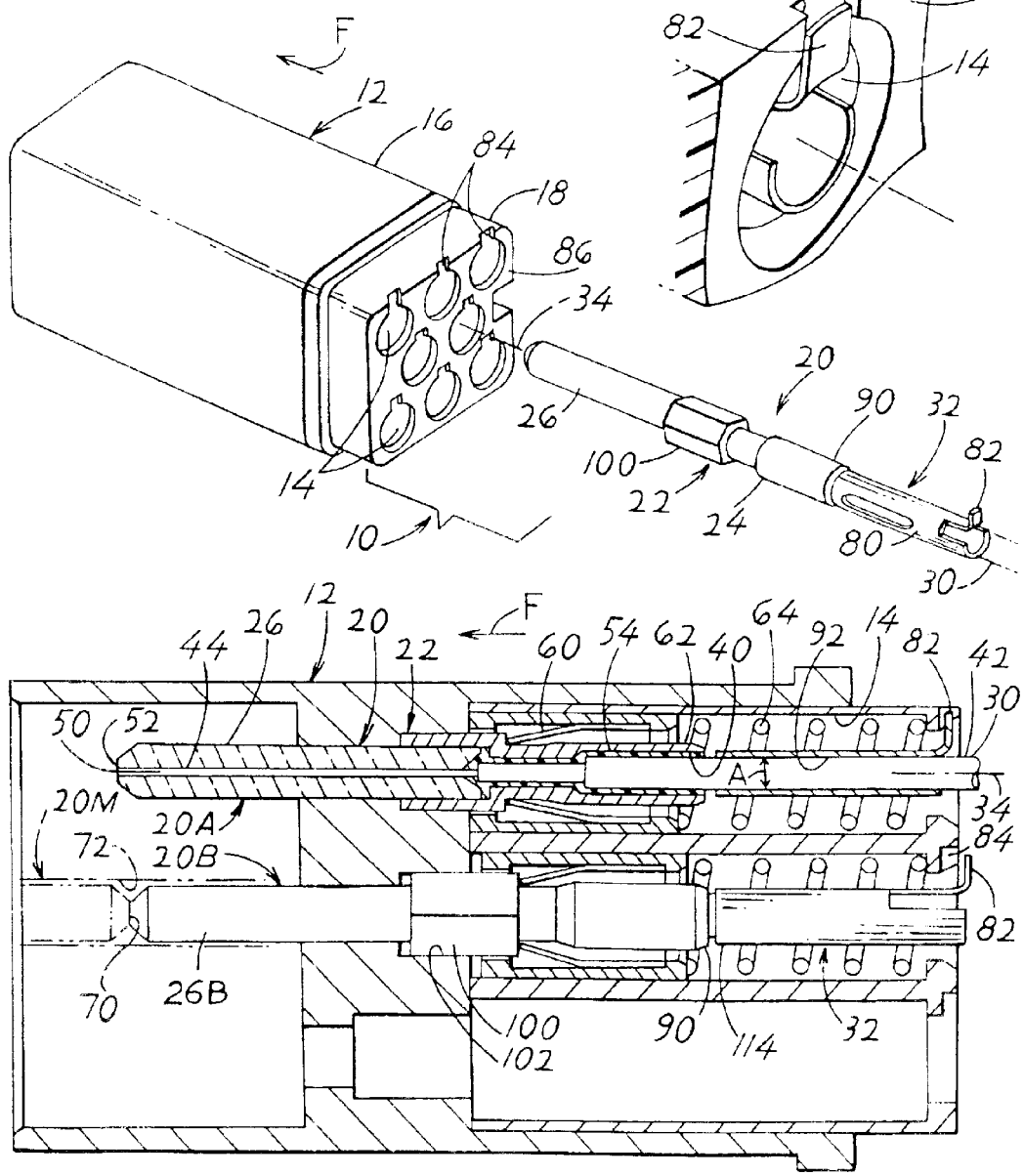

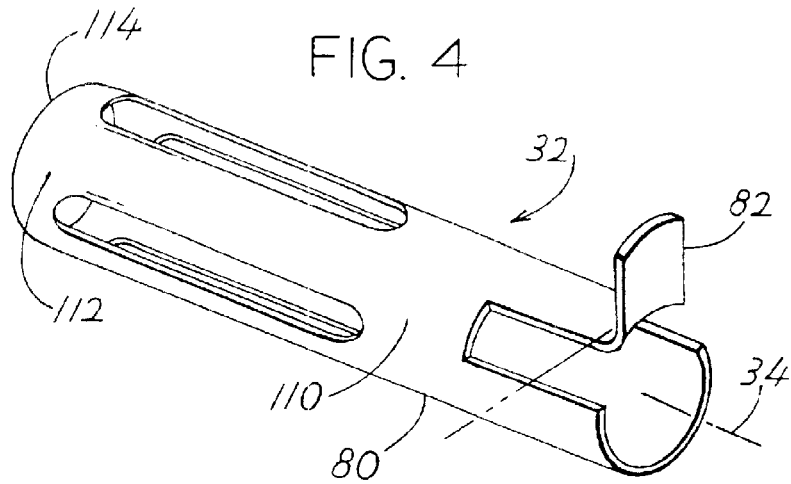
FIG. 4
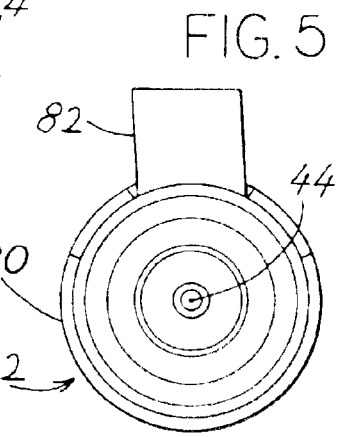
FIG. 5
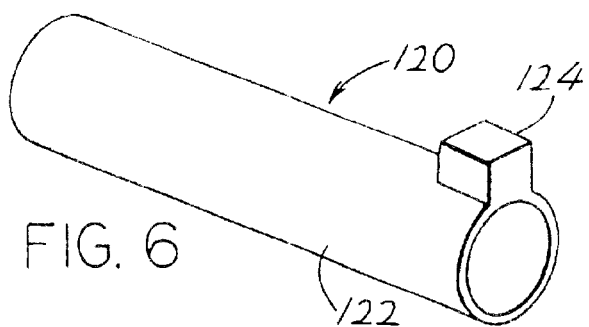
FIG. 6
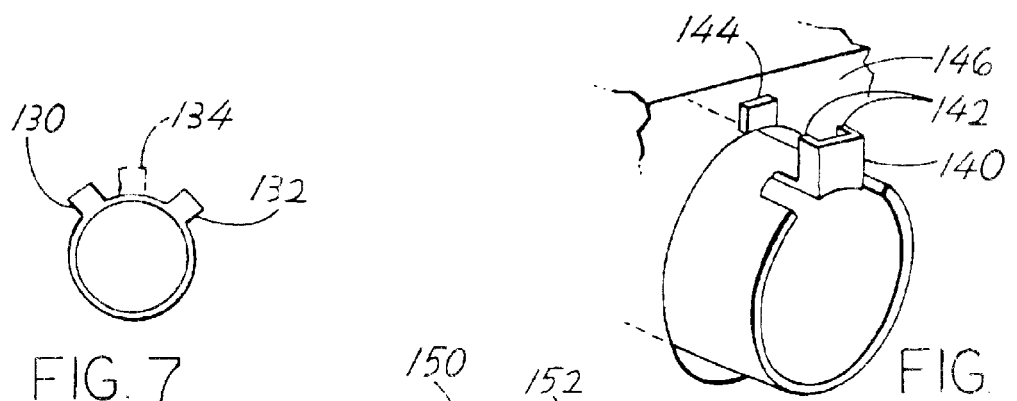
FIG. 7
FIG. 8
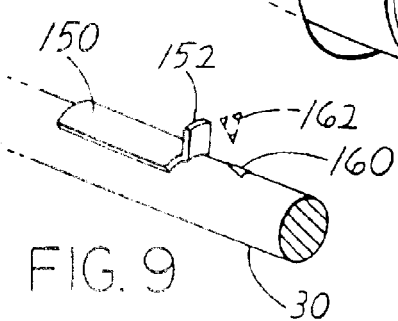
FIG. 9

OPTIC FIBER TERMINUS INDEXER

BACKGROUND OF THE INVENTION

Optical fibers are commonly coupled to one another by attaching a terminus to the stripped end of each optic fiber cable, with the tip of each optical fiber flush with the tip of a ferrule of the terminus. The tips of the ferrules and fibers are aligned within a precision alignment sleeve so the tips of the two fibers abut one another. In practice, the tips of the fibers are slightly eccentric to the axis of their ferrules, and the tips lie in planes that are not exactly perpendicular to the ferrule axes. In one example, for a single mode fiber having a mode field diameter of 9 microns (0.009 mm), the eccentricity might be 3 microns. This results in an insertion loss, which is the loss of light intensity due to the light having to pass between the tips of two abutting fibers.

The insertion loss can be reduced by rotating one terminus and its corresponding optical fiber, to different positions about the terminus axis and measuring the insertion loss at each position. It is found that the insertion loss does not change much for a rotation within about ±30° of the ideal position. Accordingly, the terminus can be rotated in steps of perhaps 60° until the optimum one of six positions is reached, and the terminus then can be fixed at that position. Since a terminus occasionally has to be removed from its housing, as to clean its tip, it is desirable that any means for fixing the orientation of the terminus enable removal of the terminus and facilitate or assure that the reinstalled terminus lies at its optimum position.

SUMMARY OF THE INVENTION

In accordance with one embodiment of the present invention, an optical fiber connector is provided, of a type that includes a terminus fixed to the front end of a stripped fiber optic cable and lying in a housing passage, which includes an indexing means that at least indicates and preferably also fixes the rotational position of the terminus. The indexing means fixes the rotational position of the terminus at a single optimum rotational position even after the terminus has been removed and reinstalled in the housing passage. The indexing means can include a sleeve that is fixed directly to the optical fiber cable, at a location immediately rearward of the terminus. The sleeve is formed with a radial projection at its rear end, and the housing has a rear surface that indicates and preferably holds to the projection to indicate and fix the rotational position of the terminus.

A sheet metal indexing sleeve can extend more than 180° around the cable and have a rear end forming a projection bent 90° to extend radially outward. The rear of the housing is formed with a slot that receives the radial projection on the indexing sleeve to fix the rotational position of the terminus.

The novel features of the invention are set forth with particularity in the appended claims. The invention will be best understood from the following description when read in conjunction with the accompanying drawings.

BRIEF DESCRIPTION OF THE DRAWINGS

FIG. 1 is an exploded isometric view of an optic fiber connector and an optic fiber terminus assembly of one embodiment of the present invention.

FIG. 2 is a partial rear isometric view of the housing and terminus assembly of FIG. 1, in a fully installed position of the terminus.

FIG. 3 is a sectional view of the connector of FIG. 1 showing three passages, with one passage containing a terminus assembly shown in section, another passage containing a terminus assembly shown in side view, and a third passage shown empty.

FIG. 4 is a rear isometric view of the index sleeve device of the assembly of FIGS. 1–3.

FIG. 5 is a rear elevation view of the sleeve device of FIG. 4 and including a sectional view of the fiber optic cable.

FIG. 6 is a rear isometric view of an index sleeve device of another embodiment of the invention, wherein the device is formed of machined metal.

FIG. 7 is a rear view of an index sleeve device of another embodiment of the invention, wherein the device has two projections.

FIG. 8 is partial rear elevation view of an index sleeve device of still another embodiment of the invention, wherein a radial projection is constructed to surround a boss at the rear of a connector housing.

FIG. 9 is a rear isometric view of an index sleeve device of another embodiment of the invention, wherein the device only partially encircles a cable, and showing it mounted on a portion of the stripped cable.

DESCRIPTION OF THE PREFERRED EMBODIMENTS

FIG. 1 illustrates an optical fiber connector 10 of one embodiment of the present invention, which includes a housing 12 with outer and inner housing part 16, 18. The housing has terminus-receiving passages 14. An optical fiber terminus assembly 20 can be installed in one of the passages. The assembly 20 includes a terminus 22 with a body 24 and ferrule 26 and a stripped front end of an optic fiber cable indicated in phantom lines at 30. The connector also includes an index sleeve device 32 which is mounted on the cable 30 and which determines the rotational position of the terminus assembly 20 about its axis 34.

FIG. 3 shows two terminus assemblies 20A and 20B, with assembly 20A being shown in section and assembly 20B being shown in side elevation. The terminus 22 of the assembly 20A has a bore 40 that receives the stripped front portion 42 of the cable 30. The entire cable includes an outer jacket and a strength member within the outer jacket, neither of which is shown in the drawings. The strength members of several cables are commonly fixed together and to a mount that is fixed to the housing, the mount withstanding pulling forces applied to rear portions of the cable. The optical fiber 44 extends through the ferrule, and its front tip 50 lies precisely flush with the front tip 52 of the ferrule. An epoxy 54 fixes other portions of the cable in the bore of the terminus. A retainer clip 60 retains the terminus in the housing 12, although a tool in the form of a thin cylinder, can be inserted forwardly F around the terminus rear portion 62 to expand the clip and pull out the terminus from the connector passage 14. A spring 64 biases the terminus forwardly. As shown for the assembly 20B, this allows the tip of the ferrule 26B to engage the tip 70 of a mating ferrule, when both of them are closely held within an alignment sleeve passage 72, to transmit light from one terminus to the other.

When the tips of two ferrules and their optical fiber tips abut one another, there is an insertion loss, which represents the decrease in light amplitude as it passes from one tip to the other. One cause for insertion loss is that the tips of the two optic fibers are not precisely concentric. There is a high cost for reducing eccentricity to a very low level, so the industry just "lives" with the loss due to eccentricity of the fiber with respect to the outside of the terminus. Another cause of insertion loss is that the tips of the fibers lie in planes (which may be slightly curved) that are not precisely parallel. Again, there is a high cost for further reducing non-parallelism and non-flatness and the industry "lives" with these losses. However, it is found that the insertion loss can be minimized by rotating one of the terminus assemblies to different positions until a position of minimum insertion loss is found. The amount of insertion loss can be readily determined by measuring the loss of light when it is passed from one optic fiber cable to the other. The present invention relates to apparatus for maintaining the position of minimum insertion loss.

The index, or indexing sleeve device 32 shown in FIG. 1 is designed to position the optical fiber terminus assembly 20 at that rotational position about the terminus axis 34 that has been found to result in least insertion loss. As shown in FIG. 4, the index sleeve device 32 includes a piece of sheet metal that includes a sleeve portion 80 that encircles the stripped cable portion and holds tightly to it, and a projection 82 that projects radially away from the axis 34 of the terminus. As shown in FIG. 2, when the terminus assembly is fully installed in the housing passage 14, the projection 82 extends into or close to a slot 84 formed by anti-rotation walls 85, 87 in a rear end 86 of the housing. FIG. 1 shows that the housing is provided with a slot 84 that extends radially from each corresponding passage 14, and that lies at the rear end of the corresponding passage.

Where the sleeve 80 of the index sleeve device 32 has portions that extend 360° around the cable 30, the index sleeve device can be installed on the stripped cable front end prior to installing the stripped front end in the terminus 22. The index sleeve device 32 initially lies a few millimeters rearward of the rear end 90 of the terminus, on a cable portion that trails behind the rear end of the terminus body. With the connector 10 mated to another connector which has its ferrule tip 70 (FIG. 3) in place, the terminus assembly 20 is moved forwardly F into a corresponding passage 14 and is pressed forward against the mating terminus. An instrument is connected to the optical fiber cables of the two terminus assemblies, and the insertion loss is measured.

After the insertion loss is measured of one position, the terminus assembly 20 is pulled rearward by several millimeters, rotated 60°, and again pushed forward to its full mating position, and the insertion loss is again measured. This is continued for six positions of the assembly 20 that are spaced 60° apart. It is noted that the terminus body has a hexagonal surface portion 100 (FIG. 1) that facilitates insertion of the assembly 20 in each of six positions angled 60° apart. Any regular polygon having between four and twelve sides (possibly more) could be used. As shown in FIG. 3, the bore has a corresponding hexagonal socket part 102 forming a passage portion. It is noted that in most applications applicant finds only minimal difference in insertion loss when the terminus is rotated within perhaps ±30° from the position of least loss, so a position within about 30° of minimum loss is usually satisfactory. It is also noted that the mating terminus assembly 20M may be a standard to which all terminus assemblies are mated to determine a preferred rotational position.

When the position of minimum insertion loss is determined, the index sleeve device 32 is rotationally fixed to the stripped cable portion 30. This can be accomplished in a number of ways, including slight crimping of locations 110, 112 (FIG. 4) of the sleeve 80 around the stripped cable portion, to more tightly hold the sleeve 80 to the cable. It is noted that the sleeve device 32 is normally subjected to only small forces tending to rotate or slide it, so holding it against only moderate such forces is often sufficient. The main purpose of the sleeve device 32 is to indicate to a technician what the rotational position of the cable must be when the terminus assembly is installed in a passage. The projection 82 also indicates when the terminus has been fully installed. Where the hexagonal body portion 100 (FIG. 1) is present, the hexagonal portion 100 prevents rotation of the cable with respect to the walls of the passage during testing for optimal position.

Prior to crimping or otherwise fixing the indexing sleeve device 32 to the cable, the indexing sleeve device is moved forwardly, so the radial projection 82 will fit into the corresponding slot 84 of the housing, as shown in FIG. 2. However, it is not necessary (though preferred) that the projection 82 actually fit in the slot 84, since its indication of the preferred rotational position is indicated by the fact that it is aligned with a slot 84 that acts with the projection as indicators. It is possible to fix the index sleeve device to the stripped cable portion in a number of different ways, including a press fit, a crimp, providing tangs that "bite" into the cable, and a bond that uses adhesive. In FIG. 3 the stripped cable has an outside diameter A of 0.90 mm and the sleeve has the same inside diameter A and is fixed by adhesive. It can be seen from FIG. 3, that the front end 114 of the index sleeve device 32 preferably lies immediately (with about 3 millimeters) behind the rear end 90 of the terminus body, to assure that the radial projection 82 lies in or close to the slot 84 at the rear of the housing.

FIG. 6 illustrates another index sleeve device 120 that is similar to the device 32 of FIG. 4. However, the device 120 is formed of machined material, which forms a cylinder 122 and radial projection 124.

A variety of variations on the index sleeve device can be used. FIG. 7 shows a pair of radial projections 130, 132 which are designed to fit into corresponding slots at the rear of a housing, to substitute for a projection that would lie at 134. FIG. 8 illustrates a projection 140 with sides 142 that are designed to lie on opposite sides of a boss 144 formed on the rear 146 of the housing.

FIG. 9 illustrates another index sleeve device 150 which encircles only a portion of the stripped cable portion 30. The particular device 150 extends slightly less than 180° about the cable axis but provides a projection 152. The index sleeve device 150 can be held in place by adhesive. It is possible to hold the sleeve in place by pins projecting through the stripped cable portion, although that is not preferred. FIG. 9 also shows a marking at 160 (which can be a sticker) that is intended to lie adjacent to a marking indicated at 162 at the rear of the connector housing. This can be effective, but is generally not as effective as a radial projection.

Thus, the invention provides means for indicating and preferably also fixing the rotational position of an optical fiber terminus assembly in a passage of a housing, to assure that the terminus assembly is installed at a rotational position about its axis which is of low insertion loss when connected to a particular mating terminus assembly. This can be accomplished by installing an index sleeve device which is preferably fixed to the stripped cable and which lies rearward of the terminus that is attached to the stripped cable. The index sleeve device has a radial projection and the rear of the housing has a corresponding slot or marking to indicate a position of alignment of the sleeve device with the housing. It is even possible to place a marking or other indication on the stripped cable so it lies immediately behind the rear of the housing, and to provide a corresponding marking or other indication on the rear of the housing. The terminus preferably has a body portion whose cross-section is a regular polygon such as a hexagon, which prevents terminus rotation once the hexagon enters a hexagonal socket passage portion.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An optical fiber connector that includes a housing having at least one terminus-receiving passage that has a passage axis, and an optical fiber terminus assembly that includes a terminus having a bore and an optic fiber cable with a stripped portion extending forwardly through said bore and with said cable trailing rearwardly behind said terminus, said terminus lying in said passage, including:

an indexing device fixed to said cable at a location rearward of said terminus, said indexing device having an indicator that lies at about the rear of the passage so it can be seen, and that indicates one rotational position of said cable about said passage axis.

2. The connector described in claim 1 wherein:

said indexing device comprises a sleeve that lies at least partially around said cable and that has a front end lying rearward of said terminus, with most of the length of said sleeve device lying within said passage.

3. The connector described in claim 1 wherein:

said cable has an axis and said indexing device comprises a sleeve that extends at least partially around said cable and that has a radially- extending projection that extends radially away from said cable axis.

4. The connector described in claim 3 wherein:

said housing has a rear end with a slot therein extending radially from the rear end of said passage, said slot being constructed to closely receive the radially-extending projection by forward movement of the projection into the slot to fix the rotational position of the cable and the terminus.

5. The connector described in claim 1 wherein:

said indexing device comprises a piece of sheet metal that forms a sleeve that at least partially encircles the cable, the sleeve having a narrow rear end that is bent about 90° to extend radially away from an axis of said cable.

6. The connector described in claim 1 wherein:

said terminus includes a body forming said bore, said body having a body indexing portion with an outer surface forming a regular polygon having at least four sides, and said passage has a socket part that closely receives said body indexing portion whereby the polygon portion retains the rotational position of the terminus at one of a plurality of rotational positions while the indexing device at least indicates only one terminus rotational position.

7. An optical fiber connector that includes a housing having a plurality of terminus-receiving passages with passage axes, and a plurality of optical fiber terminus assemblies that each includes a terminus having a bore and an optic fiber cable with a stripped front portion extending forwardly through said bore and with said cable trailing rearwardly behind said terminus, said terminus lying in said passage, wherein:

said housing has a rear end with a plurality of anti-rotation wall means lying radially outward of said bores;

indexing means fixed to each of said cables, each indexing means having at least one radially outwardly projecting projection that lies adjacent to a corresponding one of said anti-rotation wall means, said projection and anti-rotation wall means having adjacent shoulders.

8. The connector described in claim 7 wherein:

said indexing means comprises a sleeve that extends more than 180° around said cable and that is fixed to said cable against rotation.

9. The connector described in claim 7 wherein:

said housing rear end has a rear surface portion surrounding a rear end of each of said passages, each rear surface portion having a slot, and each of said projections is aligned with one of said slots.

10. Apparatus for use with a terminus assembly that includes a terminus having a body with a bore having a bore axis, and a fiber optic cable with a portion that extends through said bore and that has a cable portion of predetermined diameter that trails immediately behind the body, for at least indicating the rotational position of the cable about the bore axis, comprising:

a sleeve that has a sleeve axis and that has about the same inside diameter as said predetermined diameter of said cable portion that trails behind said terminus body and that is fixable around said cable portion, said sleeve having a rear end with an indicator of one rotational position about said sleeve axis.

11. The apparatus described in claim 10 including said terminus assembly, and wherein:

said sleeve lies around and is fixed to said cable portion.

12. The apparatus described in claim 10 wherein:

said sleeve has a rear end forming a projection that projects primarily radially away from said sleeve axis.

13. The apparatus described in claim 12 including said terminus assembly, and also including a connector housing that has a passage in which said terminus lies, and wherein:

said connector housing has a rear surface with a single indicator lying outside a rear end of said passage, and said projection points at said indicator.

14. The apparatus described in claim 10 wherein:

said terminus body has a portion with a polygon outer surface, and including a housing with a terminus-receiving passage that includes a polygon passage portion that receives said polygon to prevent terminus rotation.

* * * * *